(12) United States Patent  (10) Patent No.: US 6,343,409 B1
McAllister  (45) Date of Patent: Feb. 5, 2002

(54) FLEXIBLE CLIP ASSEMBLY

(75) Inventor: Robert J. McAllister, Solana Beach, CA (US)

(73) Assignee: Gold Star Plastics, Inc., Solana Beach, CA (US)

( * ) Notice: Subject to any disclaimer, the term of this patent is extended or adjusted under 35 U.S.C. 154(b) by 0 days.

(21) Appl. No.: 09/373,485

(22) Filed: Aug. 12, 1999

(51) Int. Cl.⁷ .............................................. B65B 67/04
(52) U.S. Cl. ...................................................... 24/536
(58) Field of Search ........................ 220/495.11, 495.06, 220/495.08, 908.1; 248/99, 101; 24/502, 503, 513, 515, 535–537, 30.5 R, 487; 294/98.2, 100

(56) References Cited

U.S. PATENT DOCUMENTS

| | | | |
|---|---|---|---|
| 1,030,386 A | * | 6/1912 | Comeau |
| 3,100,324 A | * | 8/1963 | Tutino et al. |
| 3,675,940 A | * | 7/1972 | Crookston |
| 3,869,760 A | | 3/1975 | Meyer |
| 3,891,335 A | | 6/1975 | Feil |
| 3,967,030 A | * | 6/1976 | Schultz |
| 4,312,295 A | * | 1/1982 | Harrington |
| 4,557,503 A | * | 12/1985 | Linn |
| 4,669,797 A | | 6/1987 | Bourdon |
| 4,838,451 A | | 6/1989 | Arkell |
| 5,363,539 A | | 11/1994 | Tisol |
| 5,388,313 A | * | 2/1995 | Cameron |
| 5,539,963 A | * | 7/1996 | Fujiwara et al. |
| 5,845,883 A | | 12/1998 | Meyer |
| 5,944,236 A | * | 8/1999 | Cinque |
| 6,017,069 A | * | 1/2000 | Imms et al. |
| 6,086,022 A | * | 7/2000 | Dalton |

FOREIGN PATENT DOCUMENTS

GB            2158138          * 11/1985

* cited by examiner

Primary Examiner—James R. Brittain
(74) Attorney, Agent, or Firm—The Maxham Firm

(57) ABSTRACT

A two-piece clip assembly for affixing a pliable bag to a container. One piece is comprised of a grabbing device capable of an open position and a closed position. The second piece is comprised of a locking device that configures the grabbing device between the open position and the closed position. The grabbing device is configured to affix a bag against a container in the closed position, and allow release of the bag from the container in the open position.

2 Claims, 4 Drawing Sheets

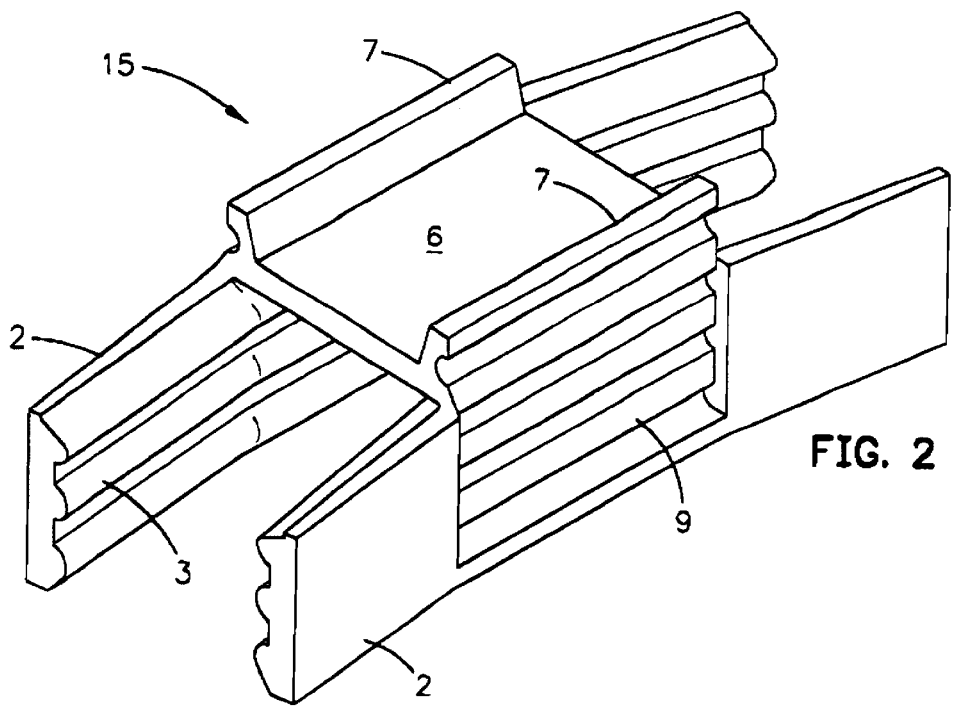
FIG. 2
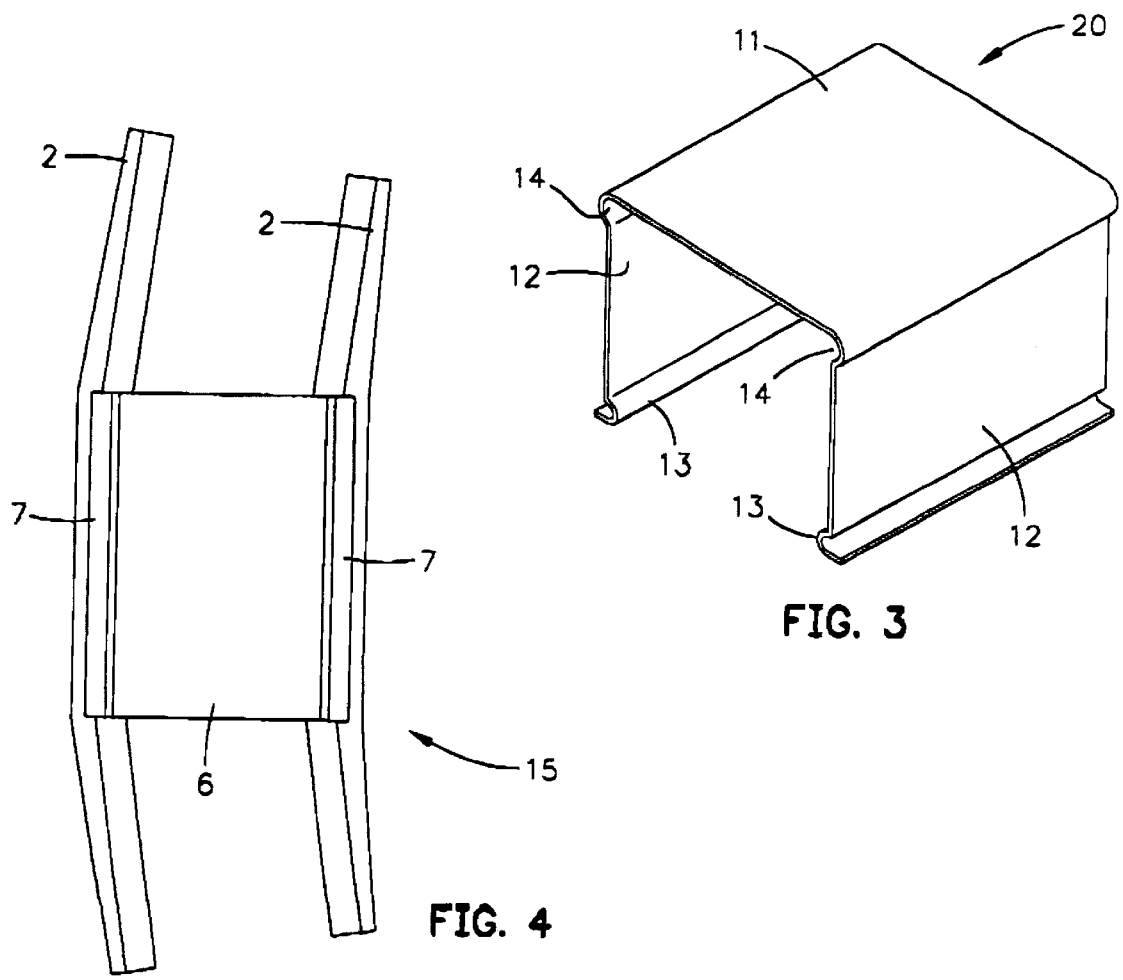
FIG. 3
FIG. 4

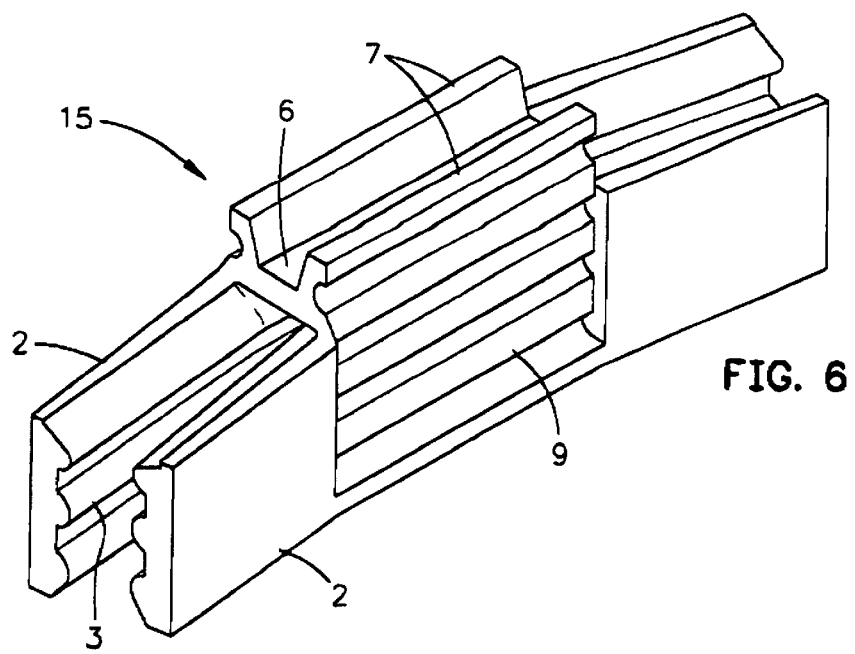
FIG. 6
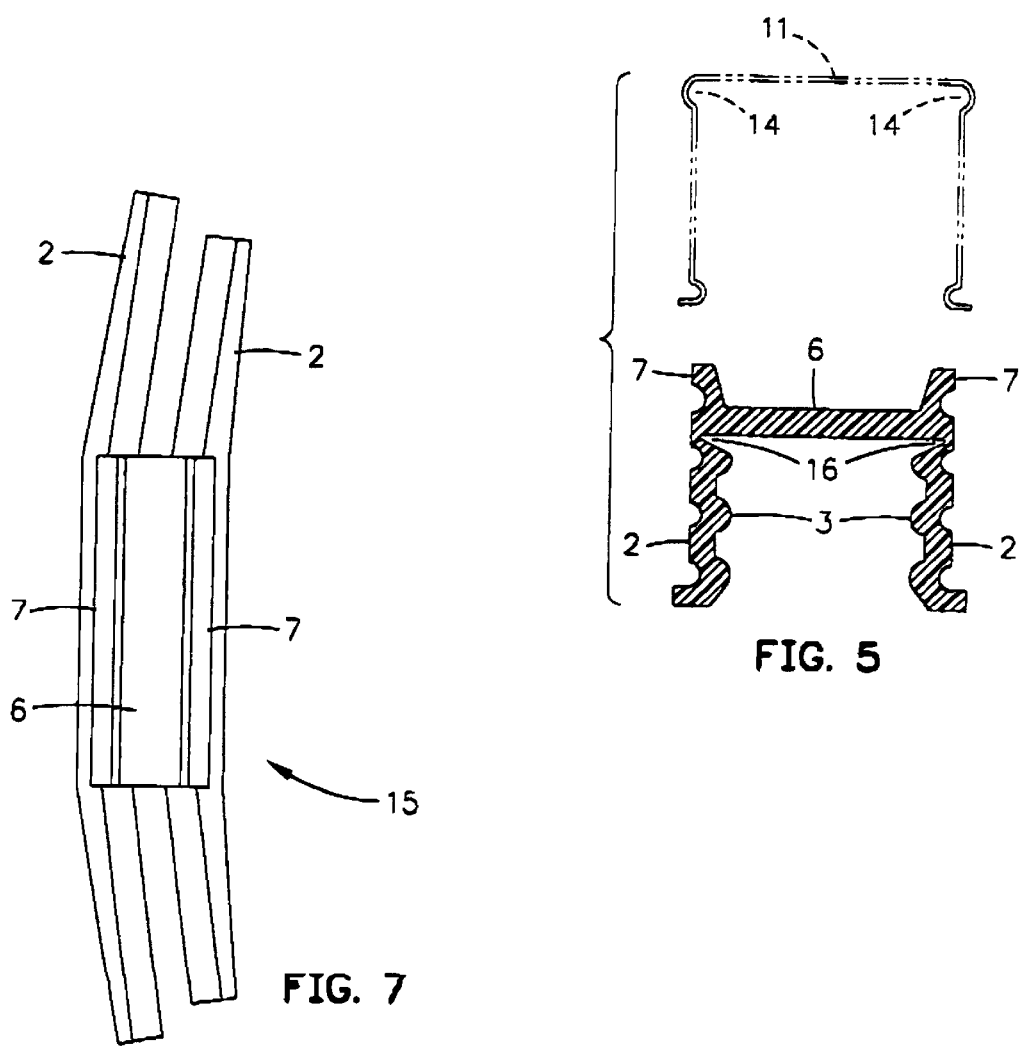
FIG. 5
FIG. 7

FLEXIBLE CLIP ASSEMBLY

BACKGROUND OF THE INVENTION

1. Field of the Invention

The present invention generally relates to clips, and more particularly, to a two-piece clip assembly to fasten a plastic trash bag to a rigid container.

2. Discussion of the Related Art

Virtually all human activity results in the generation of some refuse, or waste. The sanitary storage and collection of waste is a hallmark of a civilized society. People generally store waste, or trash, in relatively small containers ranging anywhere from one to 55 gallons in size. Plastic or paper liners, or bags, are frequently used in an effort to keep these containers clean, and to facilitate easy removal of the trash. These liners are placed inside the rigid trash container and frequently are secured to the container by folding the upper section of the bag over the lip of the container.

Several disadvantages exist with this arrangement. When garbage is placed in the bag, the bag often detaches from the lip of the container and falls to the bottom of the container, where it becomes another trash item. Attempts to remedy this by closely matching the bag opening with the container opening frequently result in bags that split or tear when folded over the container lip. And a bag that splits, or otherwise detaches from the container fails to perform its primary task of holding the refuse placed within it, and protecting the container from soiling.

SUMMARY OF THE INVENTION

The present invention solves the problem of pliable bags becoming detached from containers. Broadly, the present invention provides for the secure removable fastening of bags to containers.

More specifically, one embodiment of the invention attaches a pliable bag to a container by locating a clip over a portion of the bag and container so that a gripping section of the clip secures the bag against the container. Another embodiment of the invention secures the clip to the bag and container by placing a clasp over at least part of the clip.

The invention affords its users with a number of distinct advantages. First, trash bags no longer need to be folded over container lips, thus avoiding the possibility of tearing bags. Second, the bag remains securely attached to the container lip at all times and thus can perform its intended function of containing refuse, and protecting the container from refuse soiling.

However, the claims alone—not the preceding summary—define the invention.

BRIEF DESCRIPTION OF THE DRAWING

The nature, goals, and advantages of the invention will become more apparent to those skilled in the art after considering the following detailed description when read in connection with the accompanying drawing—illustrating by way of examples the principles of the invention—in which like reference numerals identify like elements throughout, wherein:

FIG. 2 is a perspective view of the gripping unit shown in FIG. 1;

FIG. 3 is a perspective view of the clasping unit shown in FIG. 1;

FIG. 4 is a top view of the gripping unit shown in FIG. 1;

FIG. 5 is an end elevation view of the gripping unit and a phantom elevation view of the clasping unit shown in FIG. 1;

FIG. 6 is a perspective view of an alternative embodiment of the gripping unit of the invention;

FIG. 7 is a top view of the gripping unit shown in FIG. 6;

Figure 1:
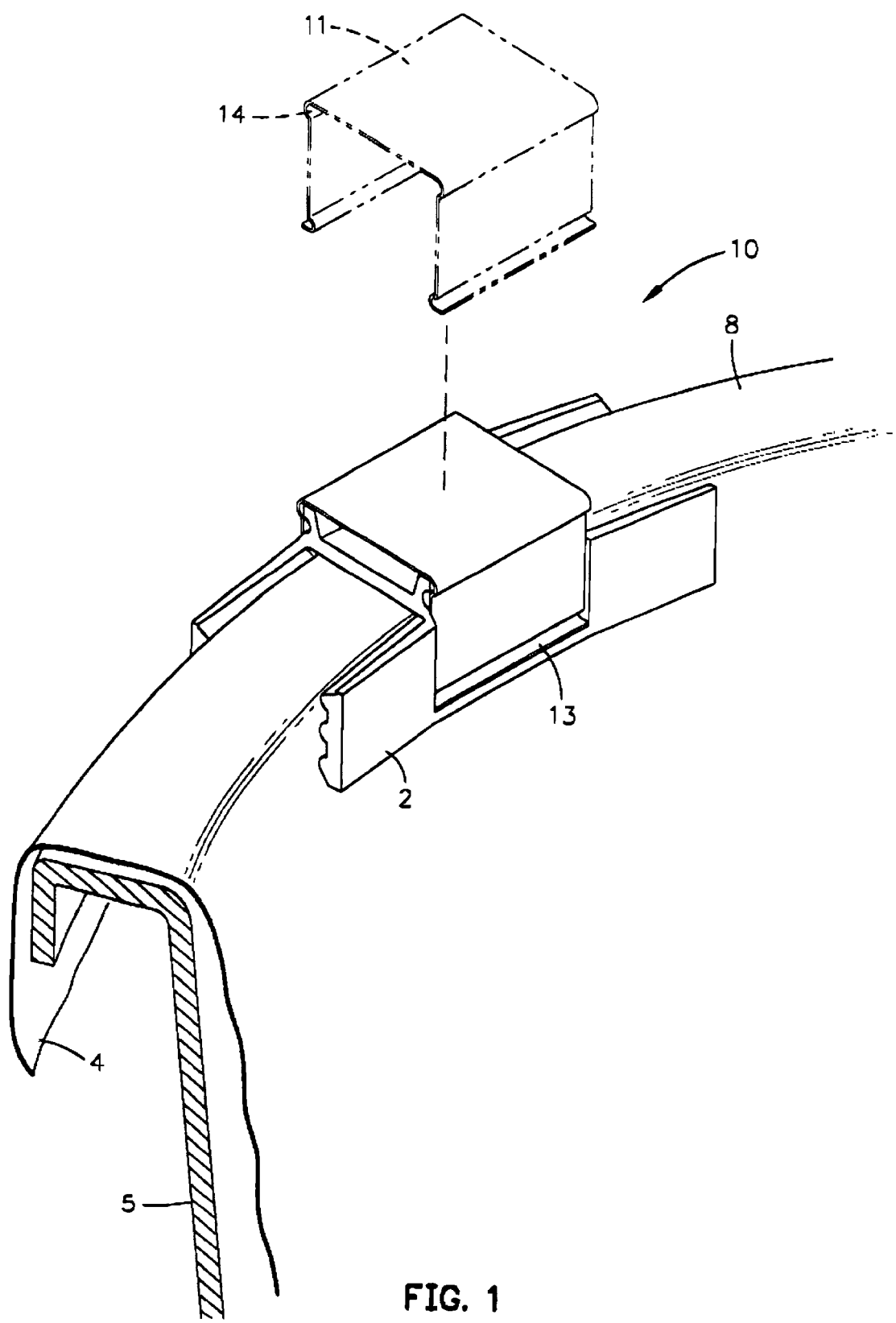
FIG. 1 is a perspective view of one embodiment of the present invention showing the gripping unit positioned over a container lip and bag with the clasping unit shown in phantom and also shown partially installed over the gripping unit.

It will be recognized that some or all of the Figures are schematic representations for purposes of illustration and do not necessarily depict the actual relative sizes or locations of the elements shown.

DETAILED DESCRIPTION OF THE PREFERRED EMBODIMENTS

General

Throughout this description, the preferred embodiment and examples shown should be considered as exemplars, rather than as limitations on the present invention. In the following paragraphs, the present invention will be described in detail by way of example with reference to the attached drawings.

As shown in the drawing for purposes of illustration, a clip assembly according to the invention provides a way to attach a flexible bag or sack to a vessel or container. Existing techniques to position and retain the bag within the container, such as folding the bag over the lip of the container, often result in ripped bags, or bags that fail to remain attached to the container lip.

The clip assembly according to the present invention provides a quick and reliable way to secure or fasten a pliable bag to a container by using two gripping arms and a clasp that forces the gripping arms to removably hold the bag against the container. The clip assembly also has a low profile that permits container lids to fit over the container without interfering with the clip assembly. The clip assembly is also easy to use and inexpensive.

Structure

Referring to FIGS. 1 and 2, a clip assembly in accordance with a preferred embodiment of the invention is illustrated and designated generally by the numeral 10. The clip assembly has a gripping or clamping unit 15 having two arms, or wings 2 that are somewhat rectangular in shape. Each arm has a ribbed inner surface 3 for gripping flexible bag 4 and container or vessel 5. Alternatively, the inner surface can consist of projections, ridges, grooves, cross-hatching or any other suitable configuration. Other embodiments of the gripping unit may have legs split into two or more separate parts. As shown in FIG. 4, a preferred embodiment of the gripping unit 15 can have slightly curved legs 2 that approximate the curvature of the container 5.

Referring to FIGS. 2 and 5, legs 2 are connected by bridge or connector 6. The bridge has two positioning or locking tabs 7 that engage with clasping unit 20, shown in FIG. 3. In a preferred embodiment, channeled outer section 9 on each arm 2 is located beneath the locking tabs. The channeled section may consist of ridges, grooves, or any suitable configuration for engaging with the clasping unit. The bridge may be curved in some embodiments to match the curvature of the container 5.

Now referring to FIGS. 6 and 7, an alternative embodiment gripping unit 15 is illustrated. Bridge 6 is narrow to accommodate narrow container lips 8, which might be found on metal garbage cans. In this embodiment, legs 2 are much closer together and can be curved or straight, like the bridge, to accommodate curved containers. In a similar manner, bridge and leg proportions can be individualized to suit distinct containers.

Referring to FIGS. 1 and 3, clasping or clinching unit 20 is illustrated. The clasping unit is generally U-shaped with an upper surface 11 and two legs or sides 12. In a preferred embodiment, the distal end of each leg terminates in a curled segment 13 that extends the entire width of the leg. Alternatively, the curled section may reside at only one or more sections of each leg 12. Upper curled section 14 is located at the upper end is of each leg 12, and in some embodiments may only reside at one or more sections of the leg.

Figure 8:
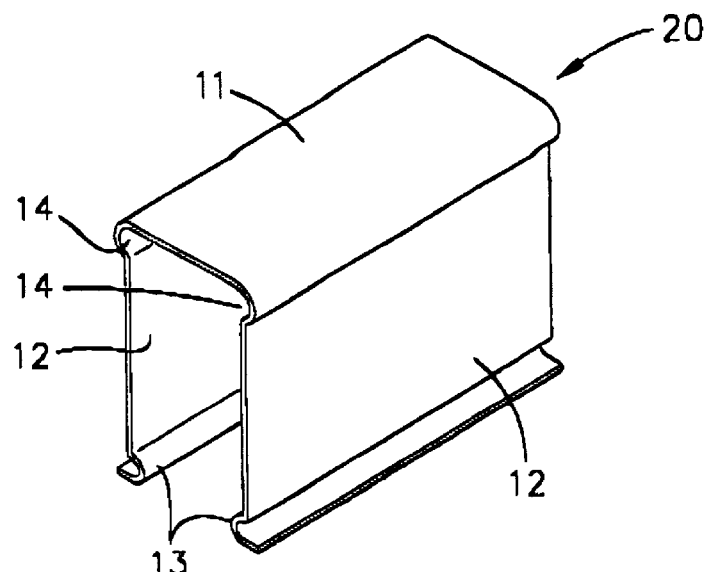
FIG. 8 is a perspective view of an alternative embodiment of the clasping unit for se with the gripping unit of FIG. 6.

As shown in FIG. 8, an alternative embodiment clasping unit 20 is illustrated. Upper surface 11 is narrow to match the narrow bridge gripping unit shown in FIGS. 6 and 7. Legs 12 are now much closer together to engage channel section 9.

The gripping unit and the clasping unit can be formed of plastics, spring steels, fiberglass, rubber, polyurethane or other suitable materials.

Operation

The clip assembly according to the present invention secures a paper, plastic or other type bag to a container or other type of receptacle. The low profile of the clip assembly avoids interference with container lids placed over containers.

As shown in FIG. 1, container 5, having a relatively wide, reverse curved lip or rim, is engaged by legs 2 near container lip 8. A preferred embodiment of gripping unit 15 has splayed, or spread legs 2, shown in FIGS. 2 and 6, to permit easy positioning of the gripping unit over a container.

Figure 9:
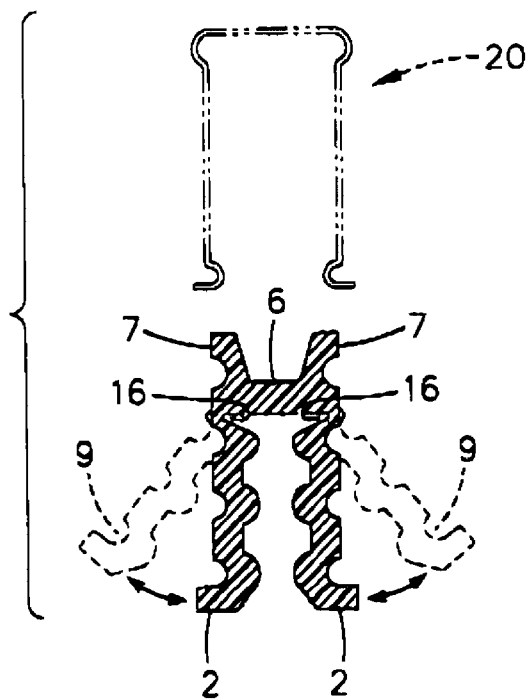
FIG. 9 is an elevation view of a clasping unit of FIG. 6 shown in phantom and a gripping unit showing the legs in gripping position and spread in phantom.

Referring to FIG. 9, a narrow gripping unit 15 is illustrated with legs 2 shown in the gripping position and in the spread position in phantom. The legs pivot about living hinge 16 that does not fatigue, and thus the legs can be repeatably cycled from the spread to the gripping position many times without failure. If desired, legs 2 may be normally biased to the spread position for ease of positioning over the container lip.

Now referring to FIGS. 1 and 9, clasping unit 20 is positioned over bridge 6 and curled segments 13 are positioned to engage the gripping unit. The clasping unit, which is preferably made of spring steel, forces legs 2 into the gripping position to firmly trap or secure bag 4 against container 5 when forced downwardly to the final position with curled segments 13 seated in bottom depressions 9. Upper curled section 14 provides gripping projections to enable the clasping unit to be pulled upwardly to disengage the clip assembly from the bag and container. In a preferred embodiment, the clasping unit is muti-positionable along the channeled outer section. This allows for variable clamping force against the container and for quick and easy removal of clip assembly 10 from the container.

Other embodiments

Certain preferred embodiments have been described above. It is to be understood that a latitude of modification and substitution is intended in the foregoing disclosure, and that these modifications and substitutions are within the literal scope—or are equivalent to—the claims that follow.

Accordingly, it is appropriate that the following claims be construed broadly and in a manner consistent with the spirit and scope of the invention herein described.

What is claimed is:

1. For use with a container formed with an open top surrounded by a rim and normally having a removable lid, a clip assembly for affixing a pliable bag to a container, the clip assembly comprising:

a unitary grabbing device selectively capable of an open position and a closed position, said grabbing device being comprised of at least two spaced, opposing arms pivotably interconnected at a proximal edge by a bridge element which extends between said proximal edges of said arms, said arms having a distal edge normally diverging from said bridge element when in the open position; and a locking device configured to selectively engage said grabbing device to force said arms toward each other in the closed position;

wherein said grabbing device is shaped and configured to affix the bag against a container rim when in the closed position, and to allow release of the bag from a container rim when in the open position; and wherein said bridge element extends upwardly from the edges of said arms such a small distance as to avoid interference with a container lid when a lid is engaged on the top of a container.

2. For use with a container formed with an open top surrounded by a rim, and normally having a removable lid, a clip assembly for clamping a flexible bag to a container, the clip assembly comprising:

a unitary gripping device configured to be positioned over the bag and container, the gripping device having two spaced legs pivotally connected to a bridge element and extending therefrom in a normally splayed configuration; and a substantially U-shaped clasping device that couples to said gripping device thereby forcing said legs toward each other into secure engagement with the bag and a container;

wherein said bridge element extends upwardly from the edges of said arms such a small distance as to avoid interference with a container lid when a lid is engaged on the top of a container.

* * * * *